United States Patent
Schwade et al.

(10) Patent No.: US 8,239,998 B2
(45) Date of Patent: Aug. 14, 2012

(54) SOOTBLOWER WITH MODULAR CANOPY

(75) Inventors: Hans Schwade, Atlanta, GA (US); Steve Weinkle, Atltanta, GA (US); Tony Watkins, Atlanta, GA (US)

(73) Assignee: Clyde Berhemann, Inc., Atlanta, GA (US)

(*) Notice: Subject to any disclaimer, the term of this patent is extended or adjusted under 35 U.S.C. 154(b) by 670 days.

(21) Appl. No.: 12/502,352

(22) Filed: Jul. 14, 2009

(65) Prior Publication Data

US 2010/0024858 A1    Feb. 4, 2010

Related U.S. Application Data

(60) Provisional application No. 61/080,303, filed on Jul. 14, 2008.

(51) Int. Cl.
*A47L 11/40* (2006.01)

(52) U.S. Cl. .......................... 15/317; 15/316.1; 122/379

(58) Field of Classification Search ................. 15/316.1, 15/317, 315, 316; 122/379, 392, 390, 380; A47L 11/40, 11/22, 5/38
See application file for complete search history.

(56) References Cited

U.S. PATENT DOCUMENTS

| | | | | |
|---|---|---|---|---|
| 4,399,773 A | * | 8/1983 | Schwade et al. | 122/390 |
| 5,299,533 A | * | 4/1994 | Johnston et al. | 122/379 |
| 5,353,996 A | | 10/1994 | Gallacher et al. | |
| 5,379,727 A | * | 1/1995 | Kling et al. | 122/392 |
| 5,549,079 A | * | 8/1996 | Johnston et al. | 122/379 |
| 5,745,950 A | * | 5/1998 | Holden et al. | 15/316.1 |
| 5,778,830 A | * | 7/1998 | Wall | 122/379 |
| 5,836,268 A | * | 11/1998 | Wall | 122/392 |
| 7,832,366 B2 | * | 11/2010 | Hutton et al. | 122/379 |

FOREIGN PATENT DOCUMENTS

| WO | WO/98/25080 | 6/1998 |
|---|---|---|
| WO | WO2005085741 | 9/2005 |

* cited by examiner

*Primary Examiner* — Phi Dieu Tran A

(74) *Attorney, Agent, or Firm* — Michael Mehrman; Mehrman Law Office, PC

(57) ABSTRACT

A modular canopy having standardized side panels, trusses and tracks. The modular canopy includes parallel opposing sidewalls formed from multiple standardized side panels. Each sidewall extends from a front mounting structure to a rear mounting structure and carries a track that typically extends the almost entire length of the sidewall for supporting the carriage of the sootblower within the canopy. Trusses connect adjacent side panels together and extend from one sidewall to the other over the top of the sidewalls. The modular canopy may also include standardized removable or permanently attached covers. The canopy is typically assembled with permanent fasteners, such as lockbolts, that cannot be removed without destroying the fasteners. A sootblower canopy of any desired length can therefore be manufactured or repaired from a common set of component parts with one of the sections, typically an end section, cut to the desired length as needed.

20 Claims, 17 Drawing Sheets

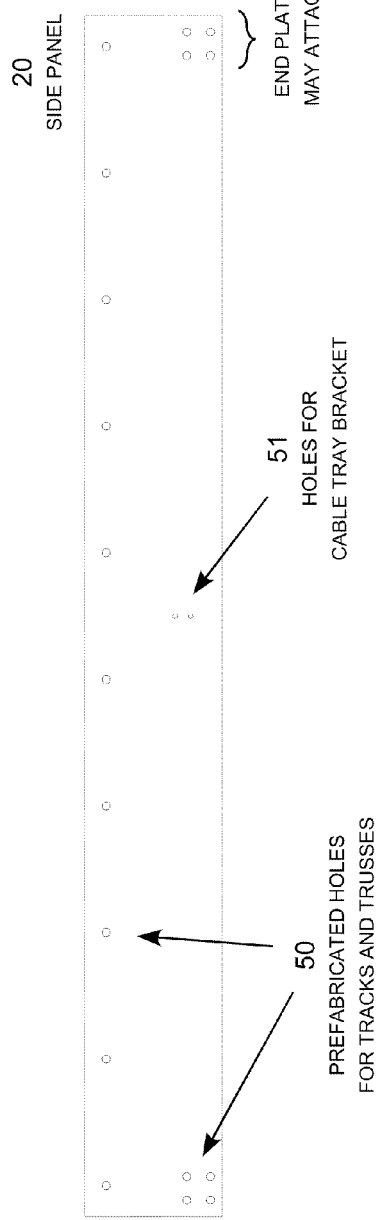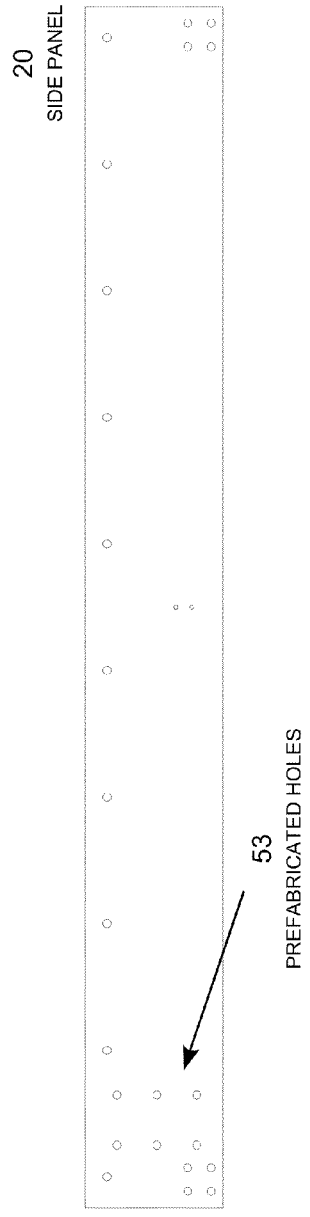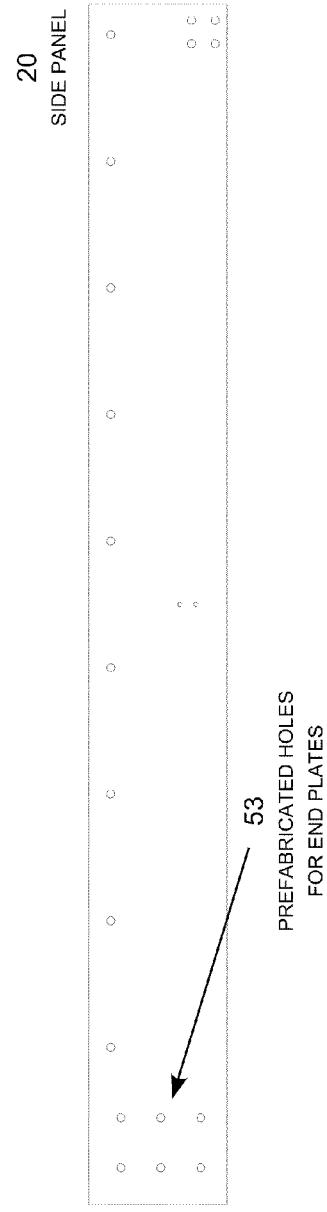

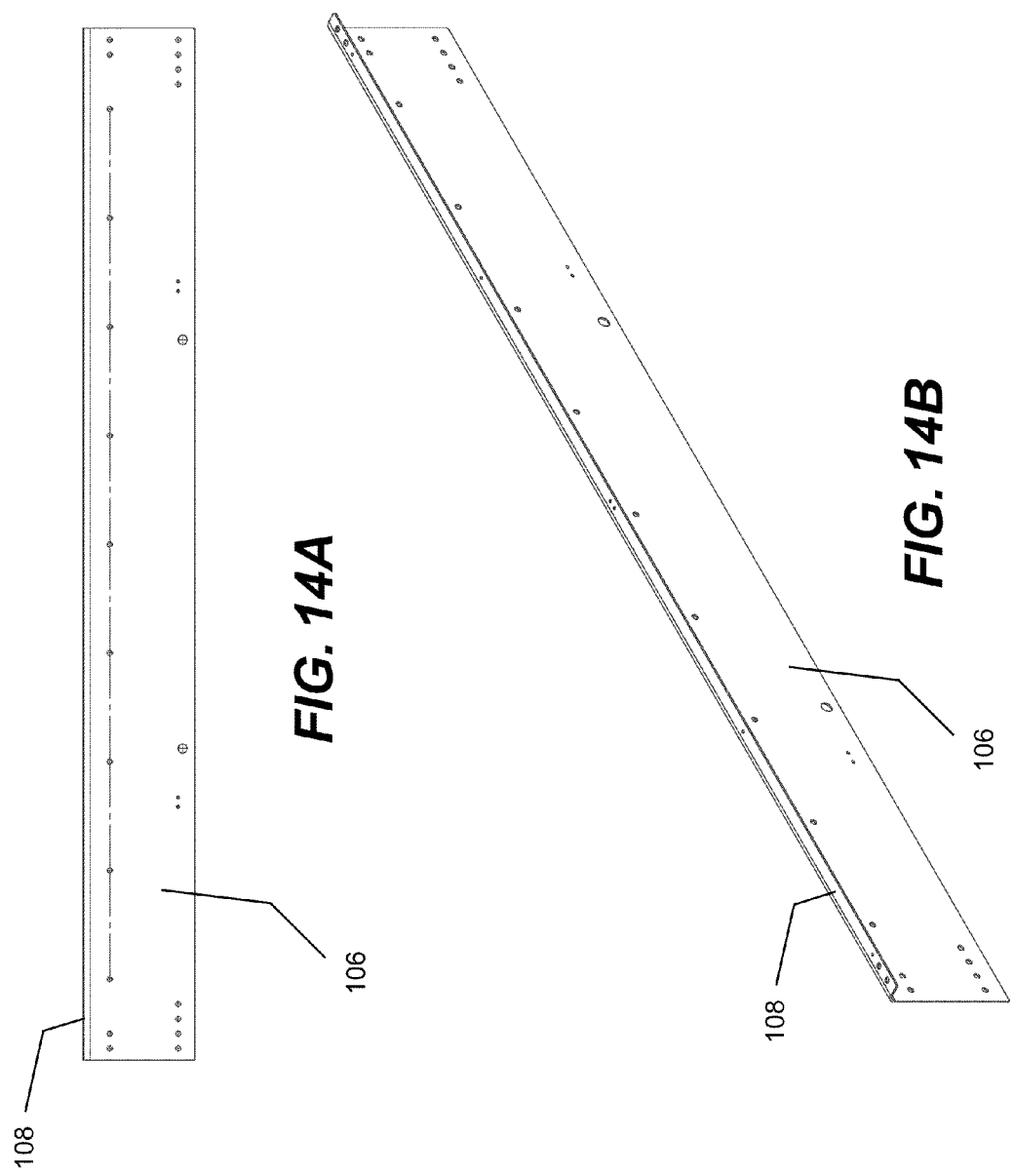

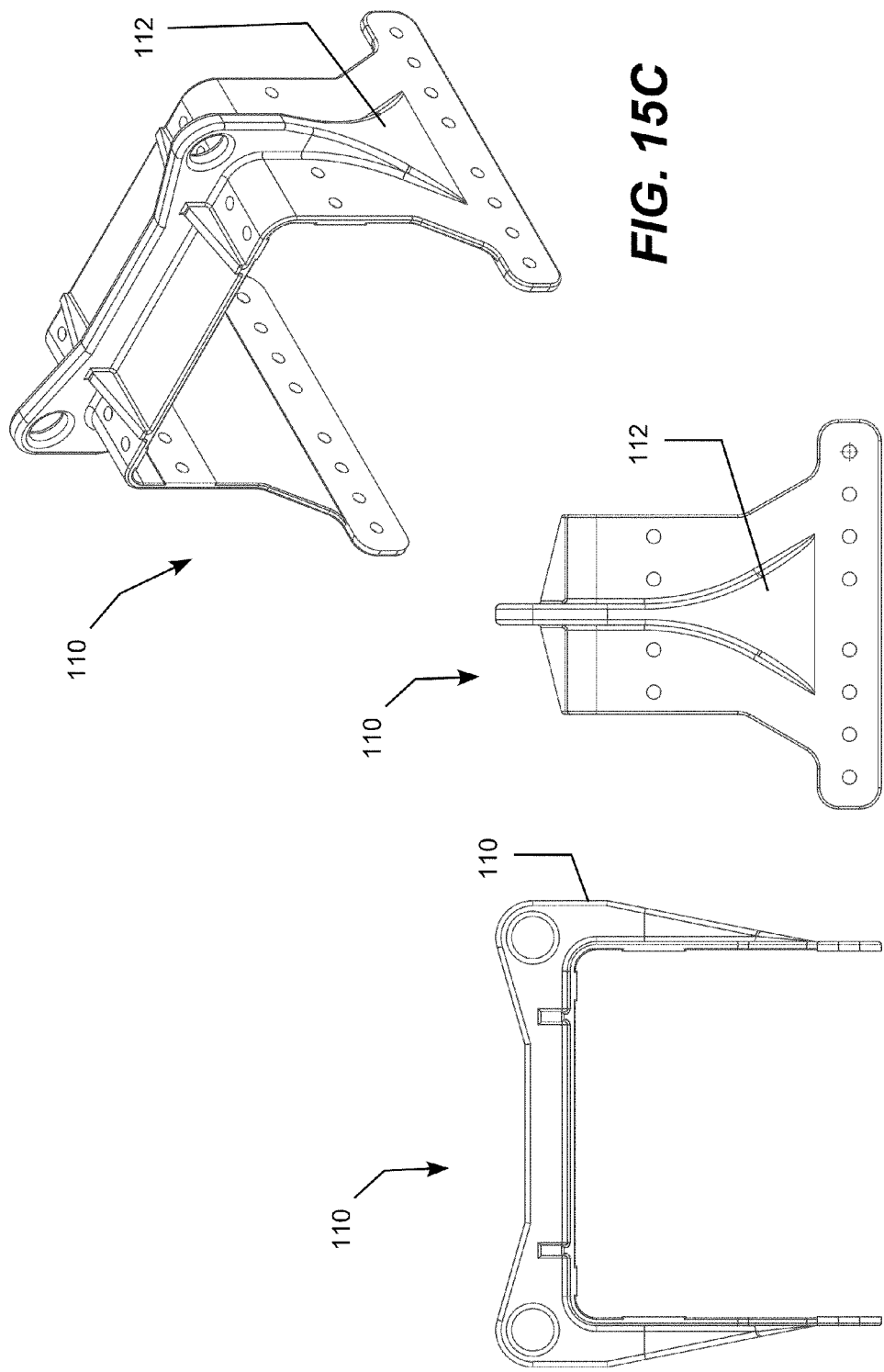

SOOTBLOWER WITH MODULAR CANOPY

REFERENCE TO RELATED APPLICATIONS

The present invention claims priority to U.S. Provisional Patent Application Ser. No. 61/080,303 entitled "Sootblower With Modular Canopy" filed 14 Jul. 2008, which is incorporated herein by reference.

FIELD OF THE INVENTION

The present invention relates to sootblowers used to clean industrial boilers and, more particularly, relates to a modular protective canopy constructed of standardized parts for supporting and protecting a long retracting sootblower.

BACKGROUND OF THE INVENTION

Industrial boilers, such as oil-fired, coal-fired and trash-fired boilers in power plants used for electricity generation and waste incineration, as well as boilers used in paper manufacturing, oil refining, steel and aluminum smelting and other industrial enterprises, are huge structures that generate tons of ash while operating at very high combustion temperatures. These boilers are generally characterized by an enormous open furnace in a lower section of the boiler housed within walls constructed from heat exchanger tubes that carry pressurized water, which is heated by the furnace. An ash collection and disposal section is typically located below the furnace, which collects and removes the ash for disposal, typically using a hopper to collect the ash and a conveyor or rail car to transport it away for disposal.

Each plant includes a number of cleaning devices known as long retractable sootblowers mounted to the exterior walls of the furnace. The long retractable sootblower includes an extending and retracting lance that enters into the furnace to blow water and/or steam onto the interior of the furnace to remove accumulated ash and slag. The movable lance tube surrounds and moves telescopically along a fixed supply tube, which receives a supply of steam through a control valve. The supply tube is mounted to the exterior of the furnace and a carriage assembly moves the lance tube along the supply tube to extend and retract the lance tube into and out of the furnace. As a telescoping tubular structure, the sootblower is a long and narrow device with the length depending on the particular boiler served by the sootblower and, in many case, the section of the furnace serviced by the particular sootblower.

The sootblower is typically housed within a canopy, which serves as a frame that supports the sootblower and a cover that protect the supply tube and carriage assembly. The canopy is typically bolted to the exterior of the furnace and extends the full length supply tube. The carriage assembly is supported by and travels on a pair of tracks mounted to the inside of the side panels of the canopy. The length of the canopy therefore varies with the length of the associated sootblower. Because the lengths vary, sootblower canopies have conventionally been custom made for their associated sootblowers. As a result, maintenance is costly because spare parts have to be made to order or kept in inventory for each different canopy.

One type of conventional sootblower canopy, known as a closed frame canopy, is formed as a three-sided channel with the top integrally formed with the side panels. This design does not permit removal of the top for maintenance access. Another type of conventional sootblower canopy, known as an open frame canopy, has sidewalls but no top or bottom, permitting maintenance access from above and below the sootblower. It is also known to attach trusses between the side panels and place covers on top of open frame canopies to protect and prevent dust and grime from accumulating on the sootblower.

There have been attempts to address the maintenance and spare parts inventory problems associated with sootblower canopies. Certain prior sootblowers have been made with continuous sidewalls or beams extending seamlessly from the front plate to the rear plate. This design is intended to ease the inventory burden by allowing various lengths of sidewall to be manufactured from common roll stock while achieving acceptable strength and rigidity in the frame. See, for example, Johnston, U.S. Pat. No. 5,299,533 and Gallacher, U.S. Pat. No 5,353,996. Although these solutions reduce the cost of maintaining inventory by making all of the canopy sidewalls from the same roll stock, this solution still requires that spare parts be made to order or kept in inventory for each different length of canopy. Therefore, there remains a need for an improved sootblower canopy system that does not require spare parts made to order or inventoried separately for each length of sootblower.

SUMMARY OF THE INVENTION

The present invention meets the needs described above in a long, retractable sootblower that includes a modular canopy or a modular canopy for supporting and protecting the sootblower. The modular canopy is manufactured from standardized modular parts, typically including standardized side panel and truss sections that allow parts for multiple canopies to be supplied from a common inventory. The modular canopy includes parallel opposing sidewalls formed from multiple standard side panels, which in almost all cases include two or more full-length standard side panels and one standard side panel that has been trimmed to provide a sidewall of a desired specific length. This allows canopies of any desired length to be a manufactured from a standard inventory of modular components with one section trimmed to produce a canopy with a desired overall length.

The modular canopy includes a front mounting structure configured for attaching the canopy to an exterior surface of a furnace wall, a rear mounting structure, and a pair of substantially parallel opposing sidewalls extending from the front mounting structure to the rear mounting structure forming an open frame in which the sidewalls are substantially uncovered from above and below, removably covered from above and open from below, or covered from above and open from below. Two tracks for supporting the carriage assembly of the sootblower are attached to the sidewalls, with one track attached to each of the sidewalls. At least one truss connects the opposing sidewalls to each other. Consistent with the modular design, each sidewall typically includes one or more standard, full-length, substantially identical side panels with at least one additional standard side panel trimmed to give the canopy a desired length.

In addition, each truss section typically connects two adjacent side panels of each sidewall and extends over the sidewalls to connect the sidewalls to each other. The canopy may include at least one cover section positioned on top of the sidewalls between adjacent trusses. The cover section may be removable or attached to the sidewalls with permanent fasteners that cannot be removed from the canopy without destroying the fasteners. The truss typically includes a bracket and a flange, in which the bracket has an extended width dimension and the flange has an extended width dimension orthogonal to the extended width dimension of the bracket. The modular canopy may be largely assembled with permanent fasteners that cannot be removed from the canopy without destroying the fasteners. In particular, the canopy may be assembled substantially entirely with non-weld fasteners, such as lock-bolts.

The invention may also be practiced as a method for manufacturing modular canopies for long, retractable sootblowers. The manufacturer obtains a number of standardized side panel sections and standardized truss sections. The manufacturer also obtains a number of lengths of track, which may extend over several side panel sections and are preferably trimmed to extend the desired length of the canopy. Each standardized side panel section includes holes precisely located for attaching the track and the truss sections to the side panel sections. Similarly, each standardized truss section includes holes precisely located for attaching the side panel sections and the track to the truss sections, and each length of track includes holes precisely located for attaching the track to the truss sections and the side panel sections.

The manufacturer surface treats the standardized side panel and truss sections to create galvanized, electroplated, or painted side panel and truss sections and then places the standardized, surface treated side panel and truss sections into an inventory. The manufacturer takes a sufficient number of the standardized side panel and truss sections from the inventory to construct a canopy of a desired length. The manufacturer fabricates front and rear mounting structures for the canopy and modifies a pair of the standardized side panels and lengths by trimming to give the canopy the desired length. The manufacturer then assembles the canopy from the front mounting structure, the rear mounting structure, the trimmed lengths of track, the trimmed side panels sections, and the standardized side panel and truss sections. As a result, the assembled canopy is formed from a pair of substantially parallel opposing sidewalls including a number of the standardized side panels extending from the front mounting structure to the rear mounting structure with properly trimmed lengths of track attached to the sidewalls, and at least one standardized truss connecting two adjacent side panels of each sidewall extending over the sidewalls and connecting the opposing sidewalls to each other.

The manufacturer may further modify the pair of the standardized side panels by cutting holes for connecting the first pair of side panels to the front mounting structure the rear mounting structure. The manufacturer may also configure each truss with a bracket and a flange in which the bracket has an extended width dimension and the flange has an extended width dimension orthogonal to the extended width dimension of the bracket. The side panels, trusses and tracks may be attached together with permanent fasteners, such as lockbolts, that cannot be removed from the canopy without destroying the fasteners.

BRIEF DESCRIPTION OF THE DRAWINGS

FIG. 6A is a side view of a side panel of the modular canopy with a first illustrative hole pattern.

FIG. 6B is a side view of a side panel of the modular canopy with a second illustrative hole pattern.

FIG. 6C is a side view of a side panel of the modular canopy with a third illustrative hole pattern.

FIG. 14A is a side view of a side panel of the alternative modular canopy with a first illustrative hole pattern.

FIG. 14B is a perspective view of a side panel of the alternative modular canopy.

FIG. 15A is an end view of a truss of the alternative modular canopy.

FIG. 15B is a side view of the truss of the alternative modular canopy.

FIG. 15C is a perspective view of the truss of the alternative modular canopy.

DETAILED DESCRIPTION

Figure 1:
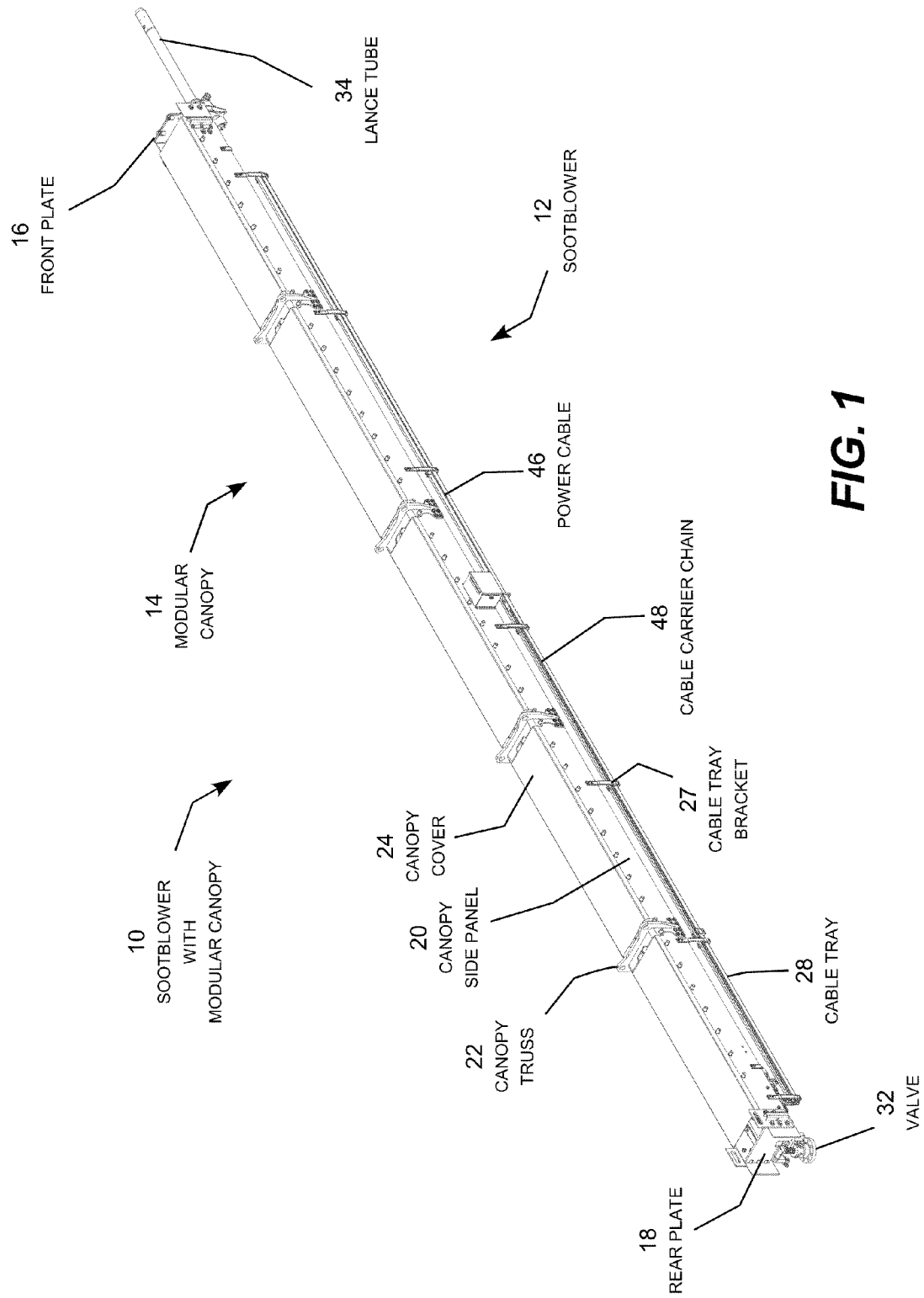
FIG. 1 is a perspective view of a sootblower with modular canopy having removable covers installed.

The present invention solves the problems with conventional sootblower canopies by providing a modular canopy having standard components including at least standard side panel and standard truss sections. The standard components may also include front mounting structures, rear mounting structures, covers, tracks, cable tray sections and cable tray support brackets to allow the entire canopy to be assembled from standardized components with minimal customization. If desired, the canopies can be assembled entirely with fasteners to avoid the need for structural welding. Although some of the canopy components may be custom made for particular sootblowers, standardization of most of the parts including the critical side panel and truss sections greatly improves the easy and cost effectiveness of manufacturing and maintaining the canopies. In addition, most or all of the components may be standardized for a particular model of sootblower used in many different plants and the same standard parts may often be the same for different types of sootblowers.

The modular canopy includes parallel opposing sidewalls formed from multiple standard side panels, which in almost all cases will include one or more full-length standard side panels and one side panel that has been trimmed to provide a sidewall of a desired specific length. The exceptions will be those rare cases in which the desired canopy length is an exact multiple of the side panel length. Once formed, each sidewall extends from a front mounting structure to a rear mounting structure and carries a track for supporting the carriage of the sootblower within the canopy that extends across multiple side panels. A single length of track usually extends almost the entire length of the sidewall so that each sidewall carries a single, continuous length of track to avoid seams in the track. Trusses connect adjacent side panels together and extend from one sidewall to the other, typically over the top of the sidewalls. The front mounting structure, rear mounting structure and truss sections may be welded but are preferably formed as standard components from castings. The modular canopy may also include standard removable covers, which are configured to site on top of the side panels between the trusses. Alternatively, the covers may be attached to the side walls with permanent fasteners, such as lockbolts, that cannot be removed without destroying the fasteners. Accordingly, one cover section is usually trimmed to conform to the trimmed side panels to give the overall canopy the desired specific length. The modular canopy may also include standard cable and standard cable tray brackets, which are used to hang the cable tray from the side panels. The covers, cable tray sections, and cable tray brackets can be standard components formed from light weight sheet metal.

The standard components are manufactured in the desired configurations with the desired precisely located hole patterns cut, typically by punching, as part of the initial manufacturing process. The precision hole pattern are typically cut at the steel mill or a specialty fabricator. The standard components are then surface treated, for example by painting, galvanizing, electroplating or other suitable surface treatment, and then placed into inventory. This prevents the components from rusting while in inventory and avoids the need to surface treat the canopies after assembly, which is an expensive and time consuming process for conventional canopies. It should be noted that the surface treatment of trimmed edges of the side panels and covers may be touched up during the assembly process to avoid having any non-treated surfaces in the finished canopy without having to surface treat the entire canopy after assembly.

The canopy is typically assembled with permanent fasteners, such as lockbolts, that cannot be removed without destroying the fasteners. A sootblower canopy of any desired length can therefore be manufactured or repaired from a common set of component parts without the need for structural welding. The use of standard components allows one set of inventory to provide spare parts for all of the modular canopies using those component parts, which will typically include all or a significant portion of the sootblowers for a particular plant, and may extend to a large number of plants. Ultimately, it will be possible to manufacture and service the canopies for a very large number of long retractable sootblowers of different lengths and somewhat different specifications from a relatively small number of standard parts maintained in a common inventory.

Figure 2:
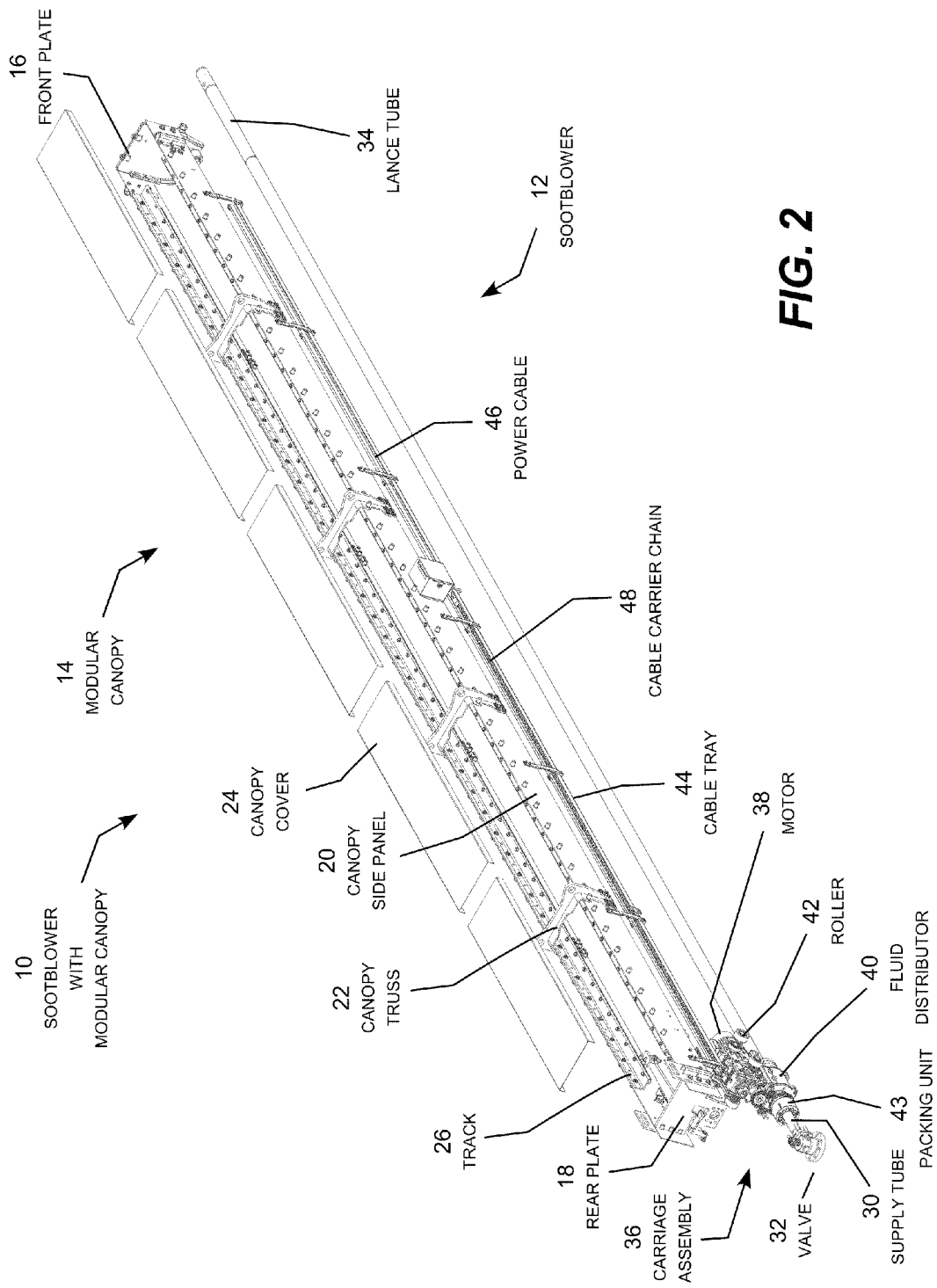
FIG. 2 is an exploded view of the sootblower with modular canopy.
Figure 3:
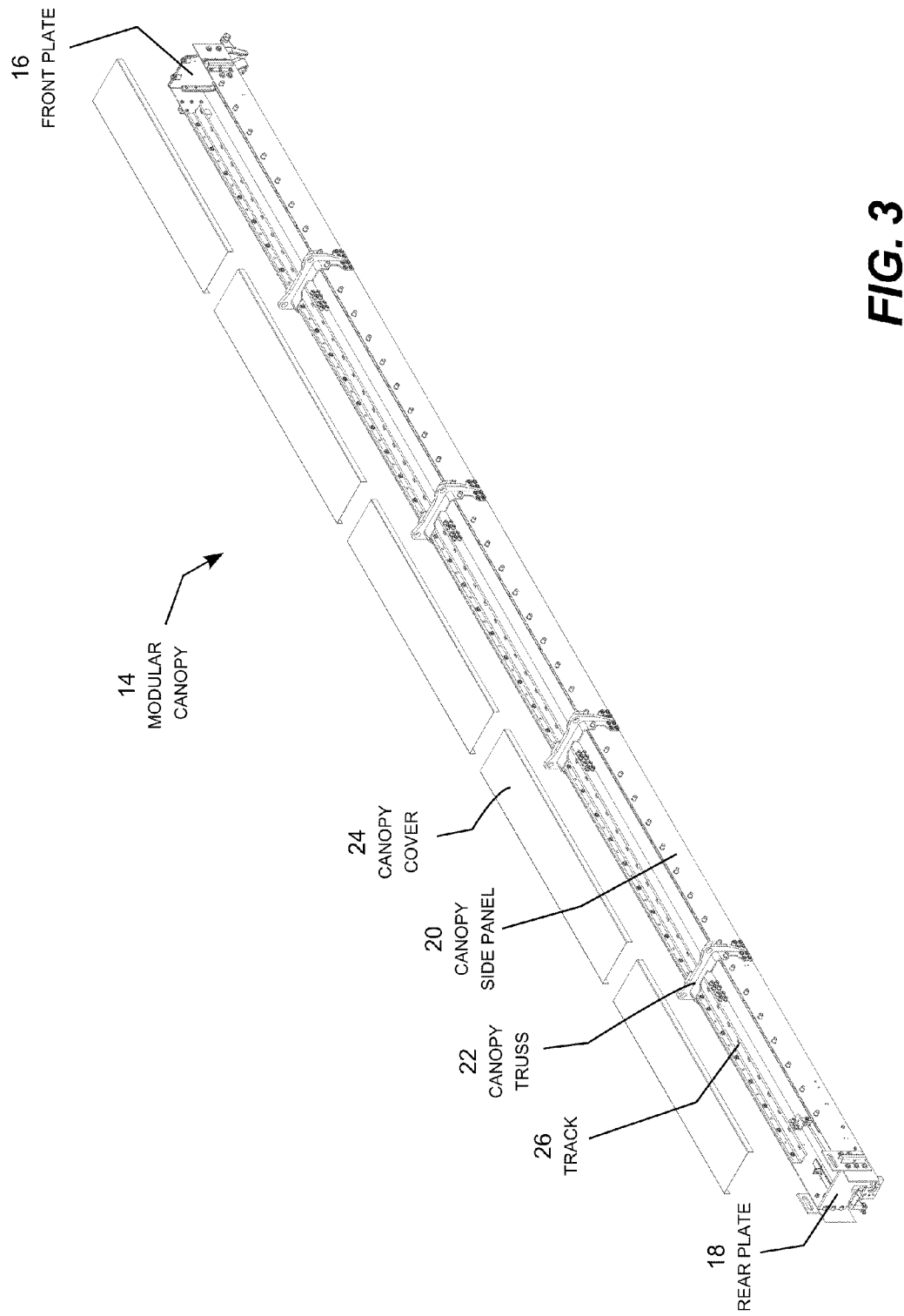
FIG. 3 is perspective view of the modular canopy with the covers removed.
Figure 4:
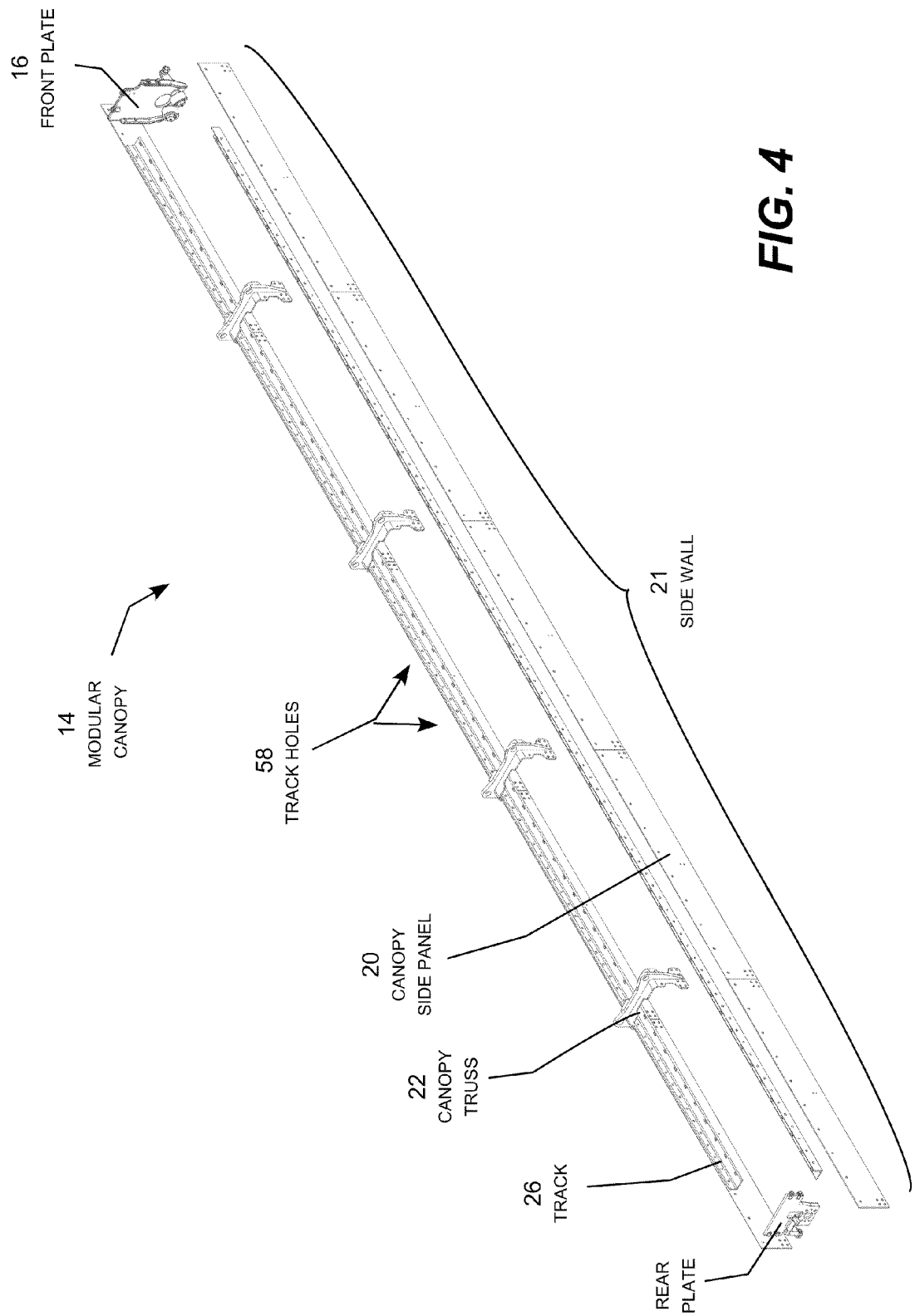
FIG. 4 is an exploded view of the modular canopy.
Figure 5:
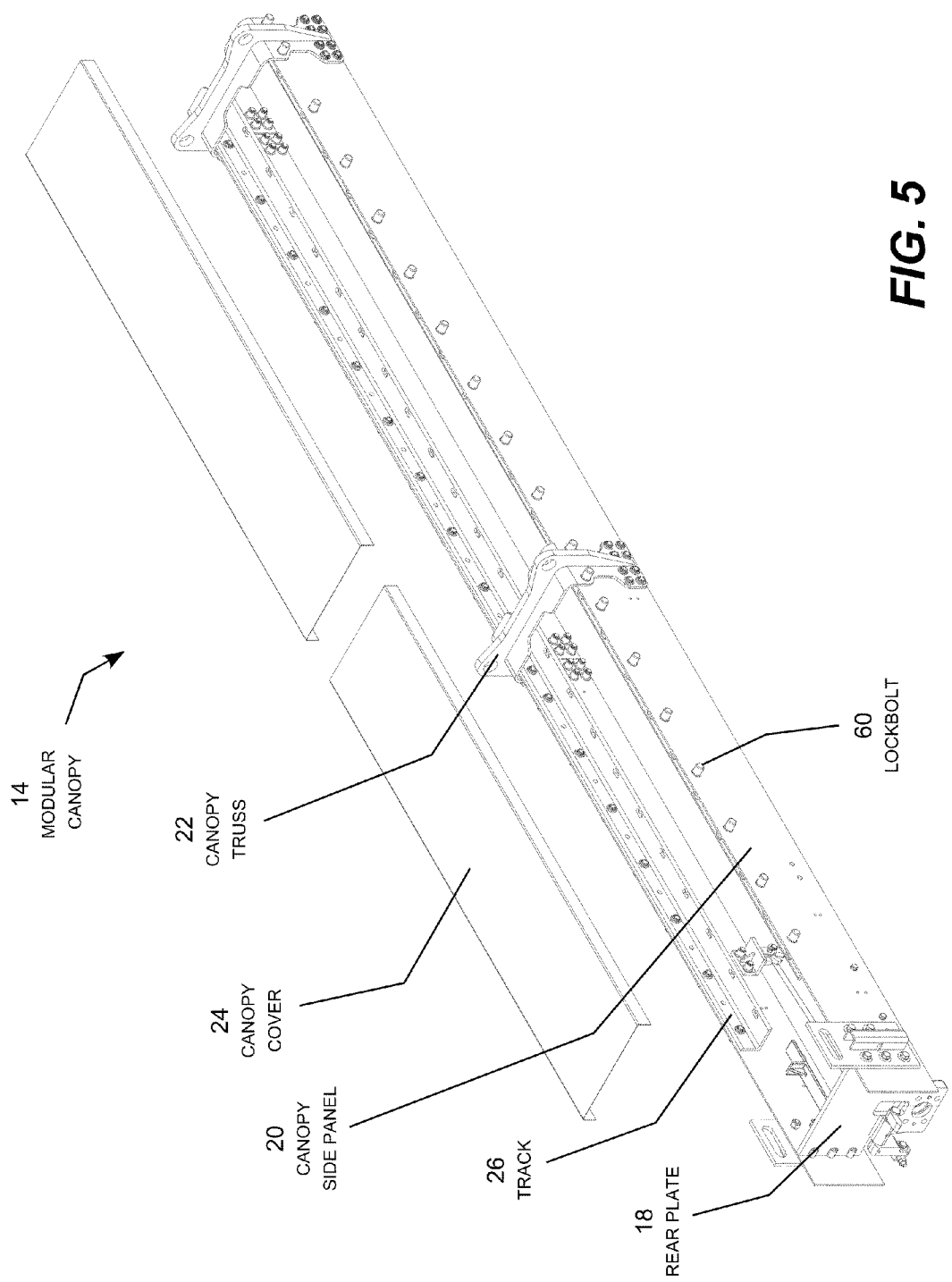
FIG. 5 is an enlarged exploded view of two sections of the modular canopy.

FIGS. 1 and 2 show assembled and exploded views of the sootblower with modular canopy 10, which includes a sootblower 12 supported and protected by a modular canopy 14. FIGS. 3 and 4 show assembled and exploded views of the canopy 14, and FIG. 5 provides an enlarged view of two sections of the canopy. The canopy extends from a front mounting structure 16, which is configured to mount to the exterior wall of a furnace, to a rear mounting structure 18 located just outboard from the rear of the sootblower. The front and rear mounting structures are further configured to mount to and support the sootblower within the canopy. The front and rear mounting structures may be fairly simple mounting plates and are often referred to as mounting plates in the industry. Nevertheless, it should be understood that the front and rear mounting structures are usually more complicated than simple plates, and usually include a number of walls, flanges, supports and holes as needed to attach to and support the sootblower and side panels. Between the front and rear mounting structures, the canopy includes a number of modular sections that create sidewalls formed from standardized side panels, trusses located at the junctions between adjacent side panels, and covers that extend between the trusses. Lengths of track are fixed along the interior of the sidewalls for supporting the carriage assembly of the sootblower. A cable tray is supported below the side panels by hanger brackets. An illustrative side panel 20, an illustrative sidewall 21, an illustrative truss 22, an illustrative cover 24, an illustrative track 26, an illustrative cable tray section 28, and an illustrative cable tray bracket 29 are labeled in certain figures.

The side panel sections include prefabricated, precisely aligned holes created prior to placing the panels into inventory for attaching the lengths of track and truss sections to the side panel sections to ensure that these components will be precisely aligned to prevent bending or warping of the canopy. The side panels may also include prefabricated holes for the front mounting structure, rear mounting structure and the cable tray bracket. One pair of side panel sections, typically the side panel sections adjacent the front mounting structure or the rear mounting structure, may be trimmed to give the canopy a desired overall length. This trimming operation and the cutting of holes for mounting the front mounting structure or the rear mounting structure to a pair of side panel sections can be performed on prefabricated side panels at any suitable shop without upsetting the precision alignment of the holes for the tracks, trusses and tracks.

A modular canopy of a desired length can therefore be formed from the standardized sections. The particular example shown FIGS. 1-4 has five sections that are each about eight feet long resulting in a sootblower with modular canopy 10 that is about 40 feet long in this example. Sootblowers typically range from as short as 8 feet up to about 40 feet. Accordingly, the example sootblower with modular canopy shown in FIGS. 1-4 can be adjusted by trimming and removing section to obtain sootblower canopies of varying lengths within the expected range. It should be noted that the truss sections are specifically designed to give the canopy the desired strength and rigidity characteristics and the load on the truss sections varies with the length of the canopy. Therefore, it may be advantageous to maintain different truss sections in inventory for different length canopies. In practice, the ability to maintain a single truss type in inventory may outweigh the cost savings from having multiple grades of trusses. Nevertheless, more than a single grade of truss section may be maintained in inventory, such as a light duty truss for canopies up to 16 feet (i.e., two side panel sections), and a second heavy duty truss for canopies over 16 feet in length.

The illustrative canopy 14 shown in FIGS. 1-4 includes sidewalls 21 that extend from the front mounting structure 16 to the rear mounting structure 18. The sidewalls 21 are formed from a number of modular side panels 20, in this example five side panels per sidewall. Adjacent side panels are joined together by a truss 22, which extends from one sidewall to the other sidewall over the top of the sidewalls. An L-shaped track 26 extending across multiple side panels is attached to each sidewall. The track 26 supports the carriage assembly of the sootblower, which rolls along the tracks. The removable cover 24 may be placed on the top of the side panels 20 between adjacent trusses 22. A cable tray 28 hangs from the side panels by cable tray brackets 29. Any desired length of canopy 14 can be manufactured by adding modular sections and trimming one of the sections, typically the end section connected to the front mounting structure. That is, the length of the canopy can be adjusted by changing the number of modular side panel sections and cutting a pair of side panel sections to provide a precise desired length.

To briefly describe the sootblower 12 shown in FIGS. 1 and 2, this device includes a supply tube 30 extending from a steam valve 32 to the furnace wall, where it is sealed to retain the steam. A sootblower lance tube 34 surrounds and travels telescopically and rotationally along the supply tube 30. The lance tube is moved by a carriage assembly 36 that includes a motor 38, a fluid distributor 40, and rollers that travel along the tracks 26 on the inside of the canopy sidewalls. The motor 38 drives the lance tube 34 telescopically along the supply tube 30 and rotates the lance tube as the fluid distributor 40 delivers steam from the supply tube 30 to the lance tube 34. Some sootblowers, known as dual-media soot blowers, also blow water through the lance. In a dual-media sootblower, the fluid distributor 40 also receives one or more water hoses and communicates the water to pipes inside the lance tube 34. A packing unit 43 at the rear of the carriage assembly 36 provides a steam seal while allowing the carriage assembly to rotate the lance tube and move back and forth along the supply tube 30. To provide utilities to the sootblower, the canopy supports the cable tray 28 that carries the power cable 46 for the sootblower motor and water hoses, when applicable. The power cable and water hoses are connected to the carriage assembly by a flexible cable carrier chain 48, such as the E-chain® cable carrier sold by Ingus, Inc., which lays down and pulls out of the cable tray 28 as the carriage assembly 36 moves back and forth along the supply tube 30. This description of the sootblower 12 is merely illustrative and the modular canopy 14, which is the focus of the present invention, may be used with any type of sootblower.

FIGS. 6A-C show the side panel 20 with three different hole patterns in greater detail. The side panel is a rectangular section of steel plate stock including precisely aligned holes 50 for attaching the side panels to the tracks and trusses. The holes 50 are prefabricated in that they are cut at the steel mill at the time of initial manufacture or by a specialty fabricator prior to entering the panels into inventory. The holes are typically cut with a punch, although other cutting methods may be used. As noted previously, precise alignment of the holes 50 is an important design feature that prevents the elongated canopy from bending or warming once assembled. The two additional holes 51 are for attaching cable tray supports to the side panels.

There are several options to accommodate the front and rear mounting structures. FIG. 6A shows a first alternative in which the standard side panel does not include prefabricated holes for the front or rear mounting structures. This design contemplates custom drilling of the holes for the front and rear mounting structures at the time of canopy assembly. This option is well suited to an application in which the hole configurations may vary for different mounting structures and applications in which the mounting structure hole configuration can be conformed to the hole pattern provided for the truss and track at the end of the standard side panel.

FIG. 6B shows a second alternative in which one end of the standard side panel includes prefabricated holes for a specific mounting structure. Since the side panel at one end of the canopy is almost always trimmed, it will typically be sufficient to provide prefabricated holes for the front or rear mounting structure and plan on trimming and drilling holes the side panel section at the opposing end of the canopy at the time of assembly. This configuration is well suited to applications in which the hole pattern for the front or rear mounting structure (or both) is standard, for example when a casting has already been obtained for one or both of the mounting structures. In addition, the truss and track hole pattern in the side panel is longitudinally symmetrical, which allows the same side panel to be use as a front or rear side panel section if the hole pattern is the same for the front and rear mounting structures.

FIG. 6C shows a third alternative for an end side panel section in which the holes for the truss and track have been omitted at one end of the side panel in favor of a hole pattern for a front or rear end mounting structure. This approach is well suited to an application in which the hole pattern for at least one of the mounting structures is known and the designer wants to avoid unnecessary holes in the standard side panel. This approach requires that two versions of the side panels be maintained in inventory, standard end sections as shown in FIG. 6C and standard center sections as shown in FIG. 6A, which may be trimmed and drilled to provide custom end sections, as needed.

Figure 7C:
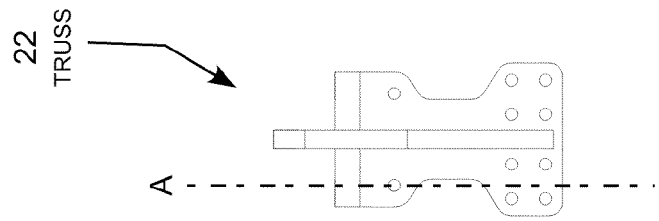
FIG. 7C is an end view of the truss of the modular canopy.
Figure 7B:
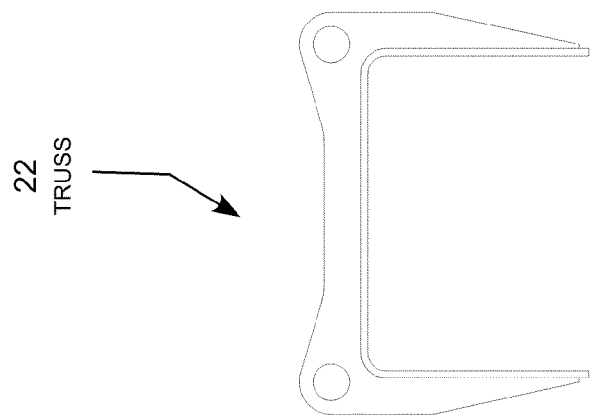
FIG. 7B is a side view of the truss of the modular canopy.
Figure 7A:
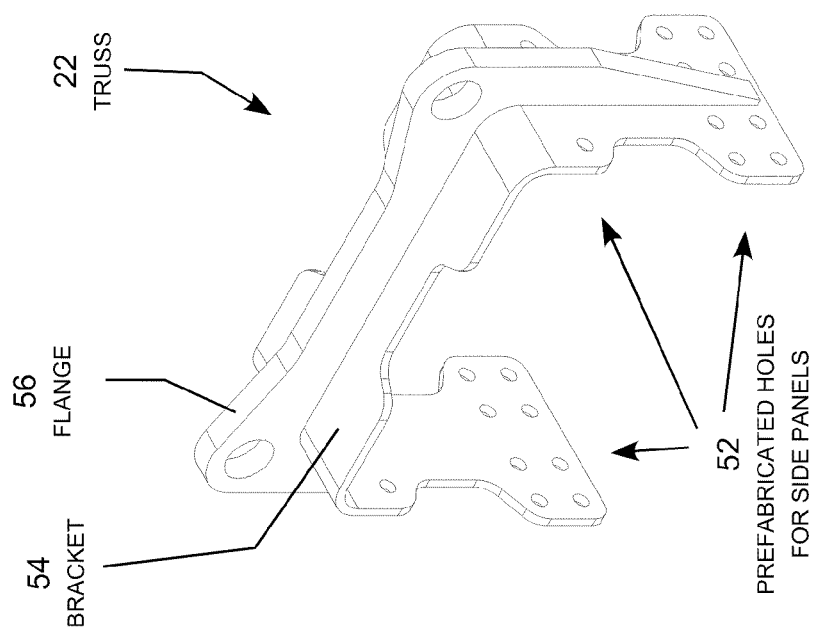
FIG. 7A is a perspective view of a truss of the modular canopy.
Figure 8B:
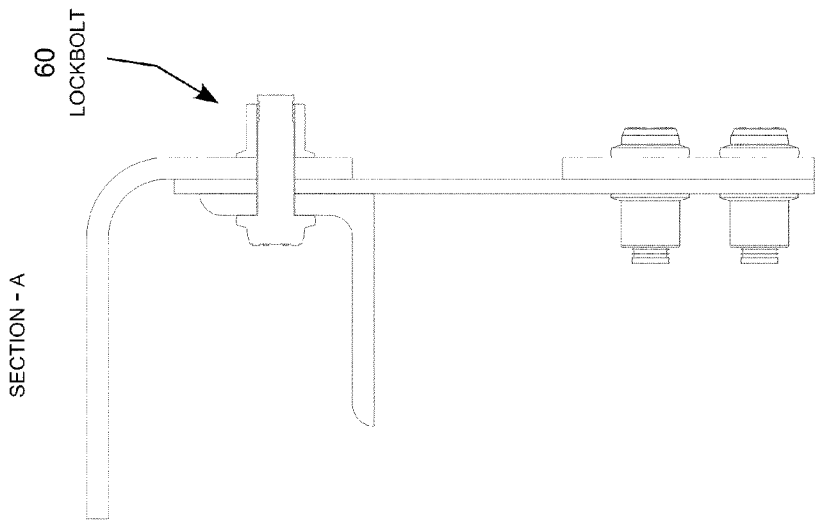
FIG. 8B is another sectional view through the side panel and truss of the modular canopy with the lockbolt fastener installed.
Figure 8A:
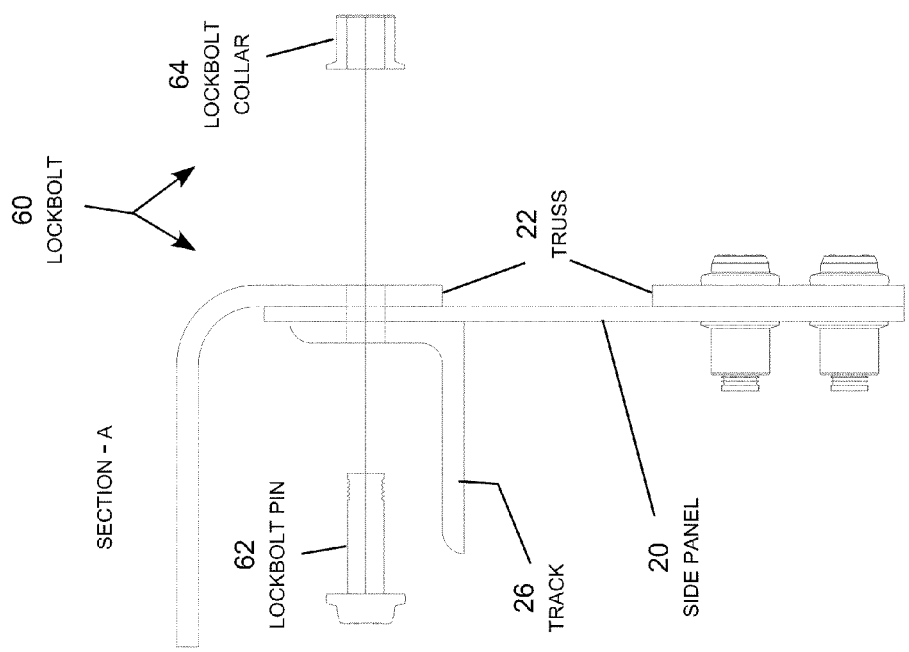
FIG. 8A is a sectional view through a side panel and truss of the modular canopy with a lockbolt fastener ready for installation.
Figure 9:
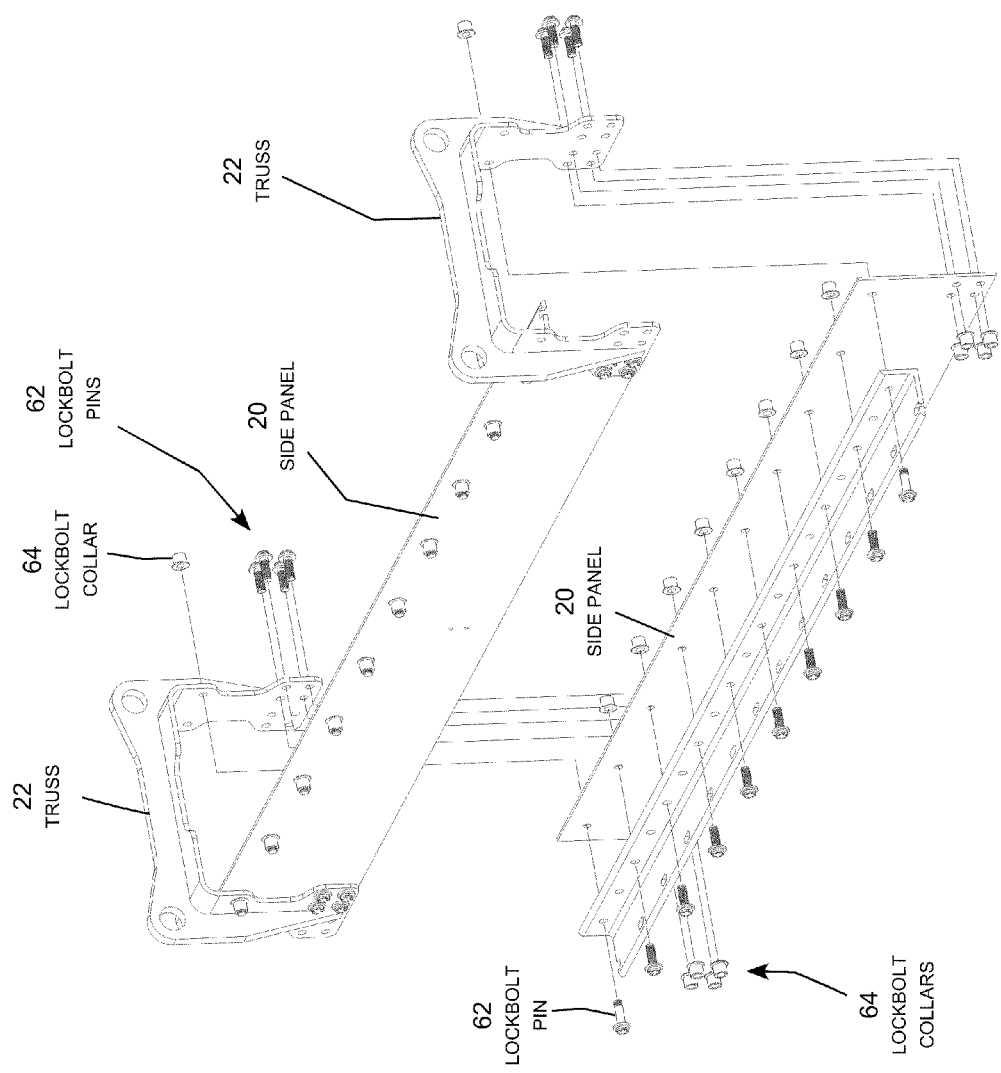
FIG. 9 is an exploded assembly view of the side panel and truss of the modular canopy.
Figure 10:
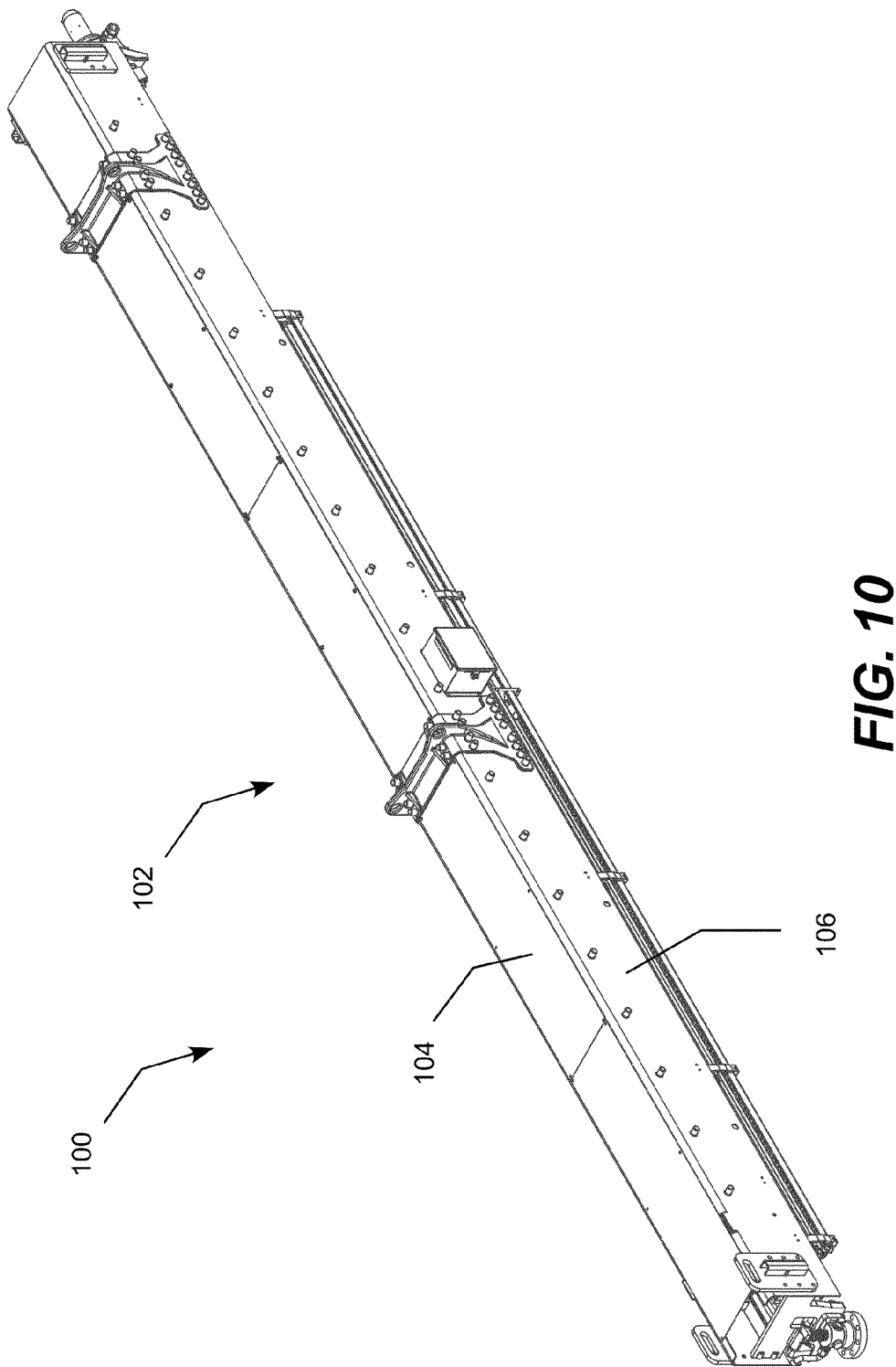
FIG. 10 is a perspective view of a sootblower with an alternative modular canopy having removable covers installed.
Figure 11:
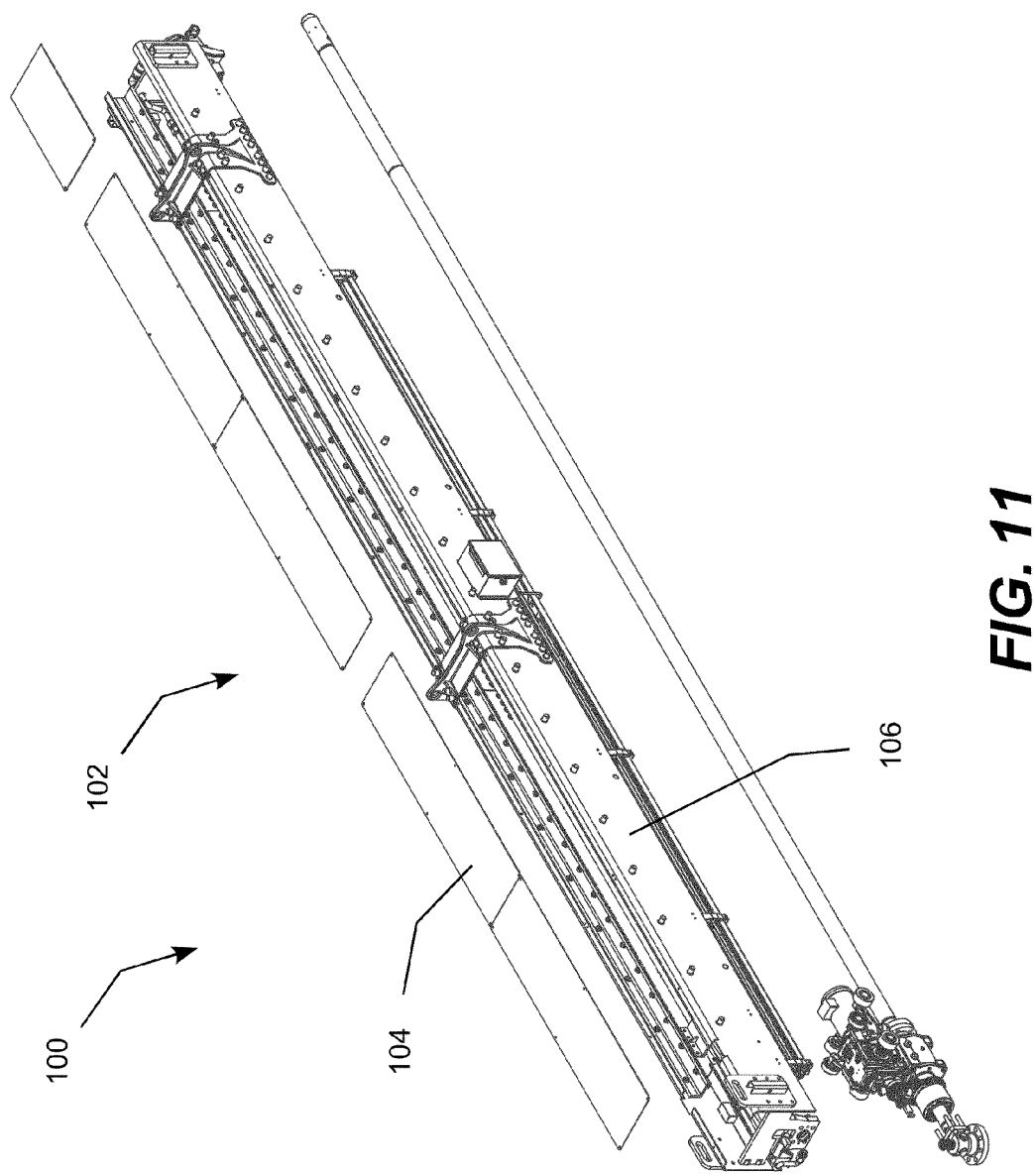
FIG. 11 is an exploded view of the sootblower with the alternative modular canopy.
Figure 12:
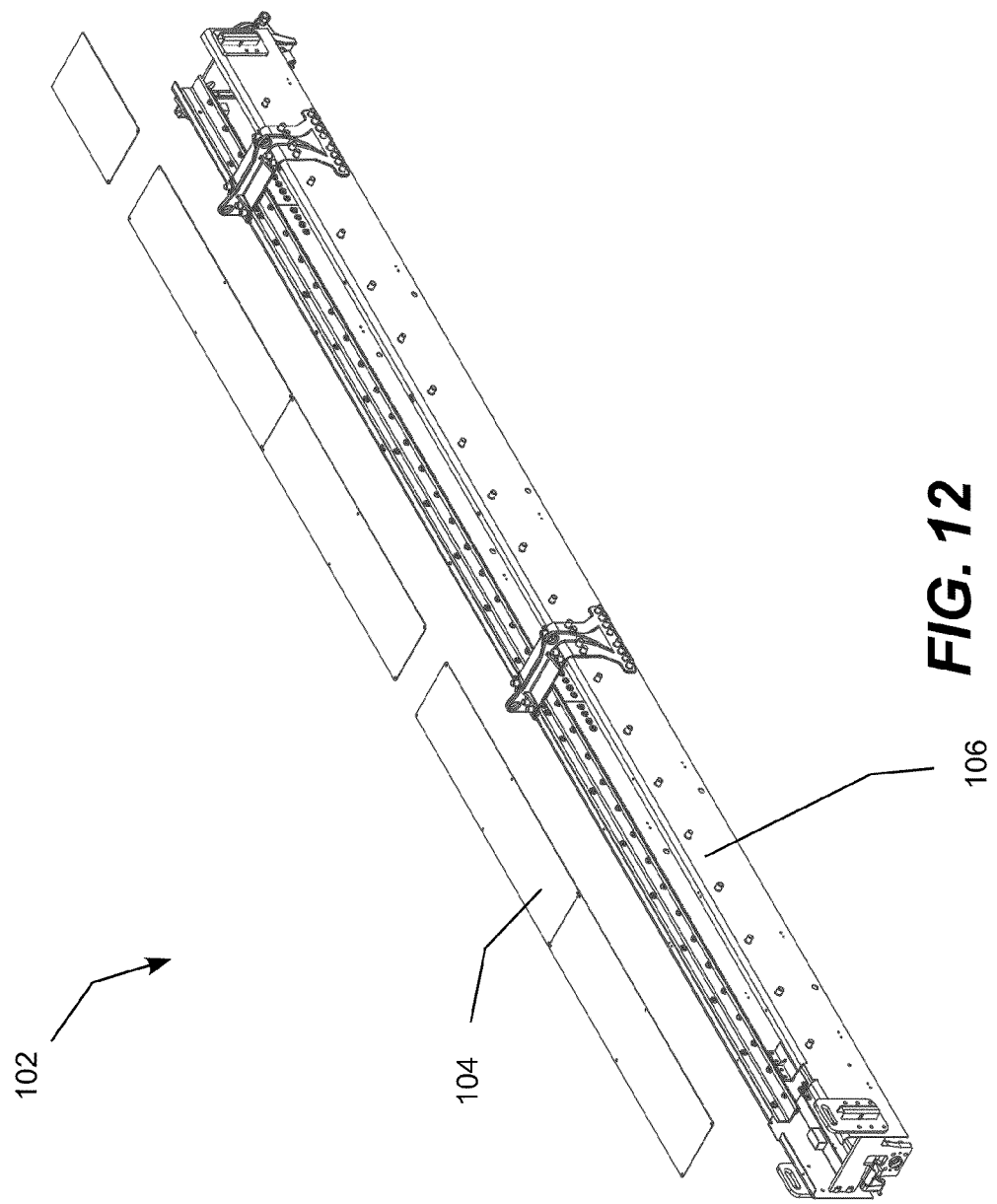
FIG. 12 is a perspective view of the alternative modular canopy with the covers removed.
Figure 13:
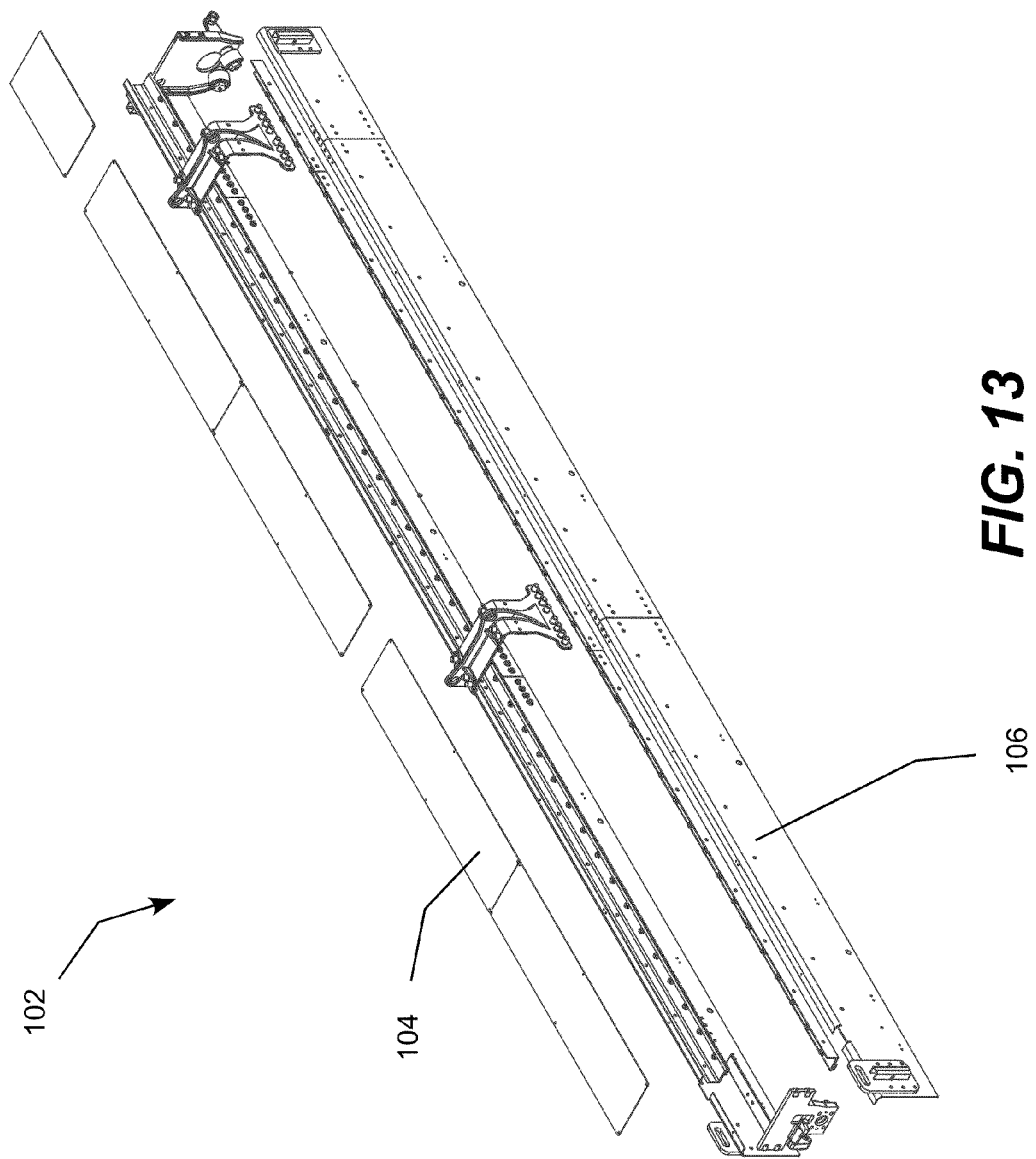
FIG. 13 is an exploded view of the alternative modular canopy.
Figure 16B:
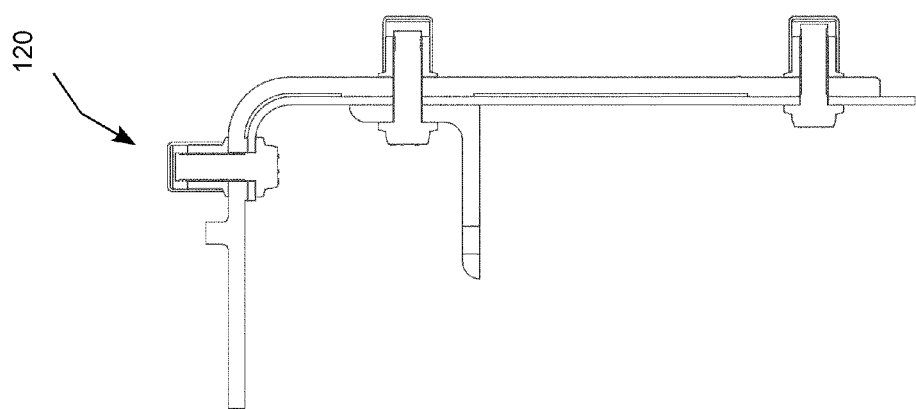
FIG. 16B is another sectional view through the side panel and truss of the alternative modular canopy with the lockbolt fastener installed.
Figure 16A:
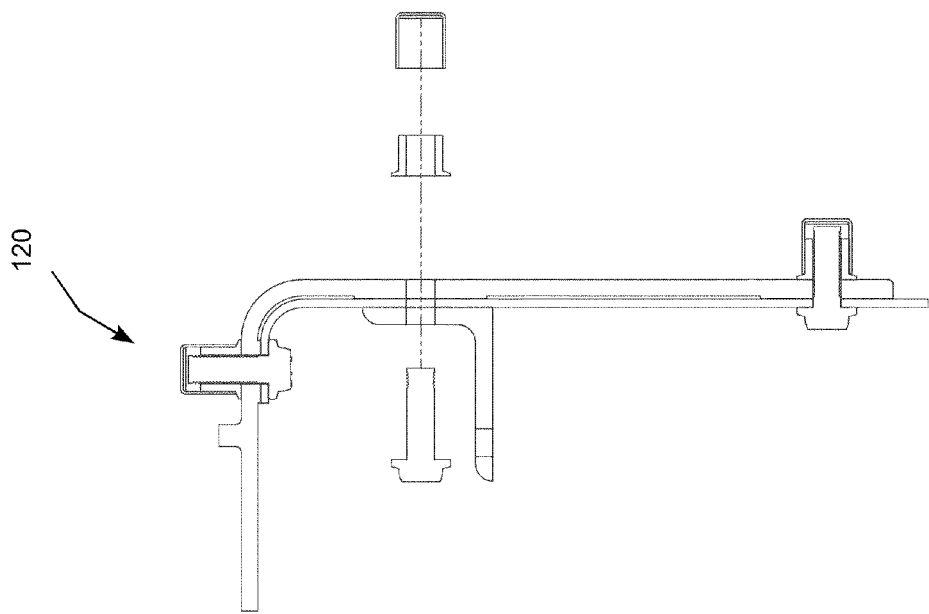
FIG. 16A is a sectional view through a side panel and truss of the alternative modular canopy with a lockbolt fastener ready for installation.
Figure 17:
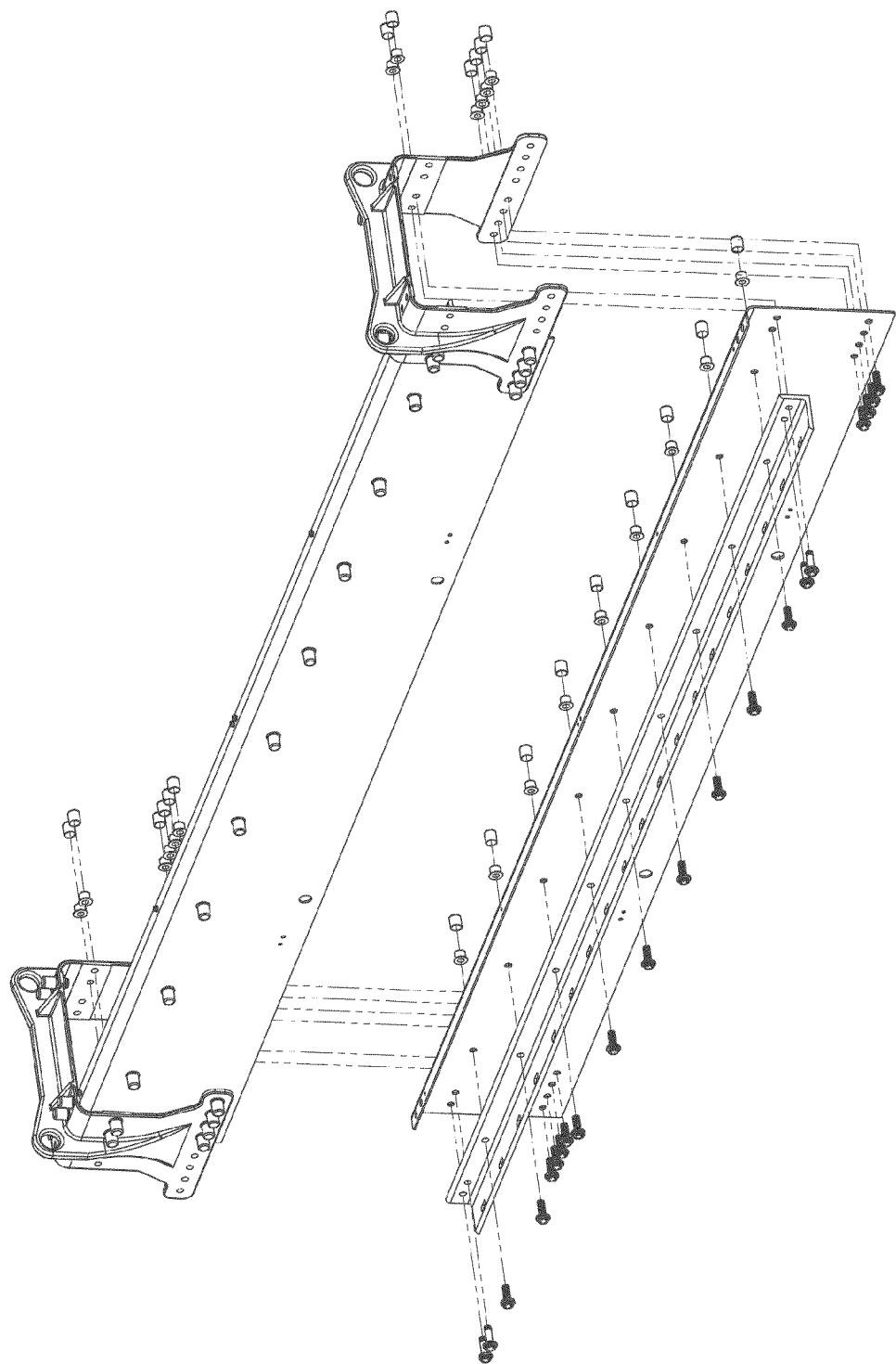
FIG. 17 is an exploded assembly view of the side panel and truss of the modular canopy.

FIGS. 7A-C show the truss 22 in greater detail. The truss sections include precisely aligned holes 52 for attaching the truss pieces to the side panels. The truss section includes a U-shaped bracket 54 attached to a U-shaped flange 56. The bracket includes an extended width dimension, and the flange includes an extended width dimension orthogonal to the extended width dimension of the bracket to provide the desired strength in a light weight truss. The holes shown in the flange are designed for lifting the canopy or canopy sections, as needed. Referring to FIG. 4, the tracks 26 also include prefabricated holes 58 for attaching the tracks to the side panels and trusses. FIGS. 8A-B show a detail of the connection between the side panel 20, the truss 22, and the track 26 along the "Section A" line shown in FIG. 7C. FIG. 9 shows an assembly diagram for attaching a pair of trusses to a side panel section Although different materials may be selected as a matter of design choice, the side panels 20 of the modular canopy 14 may be made from ¼ inch steel plate stock punched to provide the desired hole pattern shown in FIGS. 6A-B. The truss section, front mounting structure and rear mounting structure are preferably cast, which allows for precise design of the shape and thickness of the elements. The truss 22 may be made from ⅛ inch steel plate stock for the bracket 54 and ¼ inch steel plate stock for the flange 56 shaped and welded as shown in FIGS. 7A-C. However, standardization of the components makes cast parts cost effective, which is an advantage of the modular design. The covers 24, cable tray 28 and cable tray brackets 29 are not structural and may be made from any suitable material, such as 1/16 inch steel sheet metal bent as shown in FIG. 3.

The canopy may be welded or bolted together, but is preferably assembled with non-removable two-piece fasteners known as lockbolts, such as the Huck® fastener sold by Alcoa Fastening Systems. Illustrative lockbolts 60 are labeled in FIG. 5, in the section detail shown in FIGS. 8A-B, and in the assembly diagram of FIG. 9. The lockbolt is a two-piece fasteners consisting of a headed, parallel-shank pin 62 with a serrated end and a collar 64. An assembly tool is used to swage the collar onto the serrated grooves in the pin and break the stem flush to the top of the collar. It will therefore be appreciated that a lockbolt is similar to a nut and bolt except that the collar slides over the serrated pin and is then compressed onto the pin, typically using a hand-held hydraulically crimping tool. Lockbolt fasteners are easy to install like threaded bolts, but provide a permanent joint that has to be destructively removed, typically by cutting the lockbolt off with a torch.

The cable tray 28 should be attached to the cable tray brackets 29 and/or the cable tray brackets should be connected to the side panels with removable fasteners, such as nuts and bolts, to make the cable tray removable provide access to the open bottom of the canopy. This provides the modular canopy 14 with an open bottom, which provides maintenance access from below the sootblower 12. The covers 24 can be omitted or removed, when needed, to provide maintenance access to the sootblower from above. The covers can be held in place by the force of gravity, and in this embodiment are not fastened to the other canopy components. The trusses 22 are sufficiently narrow and spaced apart so that the trusses do not need to be removed to perform maintenance on the sootblower. As a result, lockbolts are preferred to avoid welding in the assembly process while still preventing the canopy from being disassembled while still attached to the furnace. When major maintenance requiring disassembly of the canopy is performed, it is preferable to remove the entire sootblower and canopy from the furnace. The entire sootblower with the canopy attached is then taken to a shop for repair, where the lockbolts are cut off with a torch. The lockbolt melts before the steel side panels, trusses and tracks, which allows the fasteners to be removed in the shop without damaging the other components.

Accordingly, the preferred approach to manufacturing a modular canopy is to obtain standardized side panels 20 with precisely positioned holes 50 and standard trusses 22 with precisely positioned holes 52. Standard sections of standard track 26 with precisely positioned hoes 58, covers 24, cable tray sections 28, and cable tray brackets 29 may also be obtained. The precisely located holes 50, 52 and 58 are typically cut during initial manufacture by the steel mill or by a specialty fabricator prior to placing the side panel, truss and track sections into inventory. The standard components art then surface treated and placed into inventory. These items are then stored in inventory and used to construct new canopies and repair installed canopies as needed.

The modular canopy with removable covers is distinguished from closed frame canopies in that the non-structural covers can be removed to provide an open frame canopy allowing maintenance access from above and below the sootblower. The modular canopy is further distinguished from closed frame canopies through the use of standardized, modular side panel and truss sections. The modular canopy is also distinguished from conventional open frame canopies, such as those described in Johnston, U.S. Pat. No. 5,299,533 and Gallacher, U.S. Pat. No. 5,353,996 utilizing continuous, seamless sidewalls. Although these open frame designs with continuous sidewalls reduce the cost of maintaining inventory by allowing different lengths of sidewall to be manufactured from the same rolls stock, they also call for seamless sidewalls. As a result, canopy sidewall inventory must be made to order or kept inventory for each different length of canopy. Johnston also describes the use of a large number of closely spaced trusses extending between the sidewalls that are designed to be removed to provide unobstructed maintenance access.

FIGS. 10-17 show a sootblower 100 with an alternative modular canopy 102. The sootblower 100 can be identical or similar to the sootblower 12 described with reference to FIGS. 1 and 2, and need not be described again here. The modular canopy 102 is substantially similar to the modular canopy 14 described with reference to FIGS. 1-9 except for a several modifications. Specifically, the canopy covers 24 are "U" shaped and configured to sit on top of the side panels 20 without fasteners, whereas the alternative canopy covers (identified by the representative cover 104 enumerated in certain figures) are flat and configured to attach to the side panels (identified by the representative side panel 106 enumerated in certain figures) with fasteners, preferably lockbolts. The side panel 106 includes a flange 108 on the top edge with holes for receiving fasteners for attaching the covers to the side panels. An illustrative lockbolt 120 for attaching the canopy covers 104 to the side panels 106 is shown in FIGS. 15A-B. Referring to FIGS. 15A-C and 8A-C, the truss 110 is strengthened over the truss 22 with a wider, flared flange 112.

The present invention provides a superior sootblower canopy solution in a modular canopy with non-removable trusses and removable ore permanently attached covers. The modular design has significant manufacturing and inventory benefits while still exhibiting the desired structural characteristics. The innovative bracket design allows the modular canopy to be substantially lighter than conventional open frame and closed frame canopies. There are no removable trusses, which simplifies the design and maintenance procedures. Producing a canopy with a precise length that is not a multiple of the standard section length requires cutting two standard sidewall sections and one cover section to the desired length, which can be performed at any suitable shop on previously manufactured standard side panel sections. Holes for mounting the side panels to the rear or front mounting structures may also be cut after the selected side panels have been trimmed to the desired length. In general, the holes for mounting the side panels to the front and rear mounting structures can be performed on standard side panels after initial manufacture of the side panels, as the hole configurations for these connections may vary for different sootblowers and precision in these connections is not critical because they do not affect the alignment of the truss and track connections along the length of the sidewalls, where even slight misalignment can cause the track to bend and the canopy to warp.

The invention claimed is:

1. A modular canopy for supporting and protecting a long, retractable sootblower, comprising:
    a front mounting structure configured for attaching the canopy to an exterior surface of a furnace wall;
    a rear mounting structure;
    a pair of substantially parallel opposing sidewalls extending from the front mounting structure to the rear mounting structure forming an open frame in which the sidewalls are substantially uncovered from above and below, removably covered from above and open from below, or covered from above and open from below;
    two tracks for supporting a carriage assembly of the sootblower, one track attached to each of the sidewalls;
    at least one truss connecting the opposing sidewalls to each other; and
    wherein each sidewall comprises at least two substantially identical standard side panels; and
    wherein, for each sidewall, the truss is located at a junction between adjacent side panels and connect the side panels to each other.

2. The modular canopy of claim 1, wherein each sidewall further includes at least one of the side panels trimmed to a desired length.

3. The modular canopy of claim 2, wherein each sidewall further includes at least two substantially identical full-length side panels and an additional standard side panel trimmed to a desired length.

4. The modular canopy of claim 1, wherein the each truss section connects two adjacent side panels of each sidewall and extends over the sidewalls to connect the sidewalls to each other.

5. The modular canopy of claim 1, further comprising at least one cover section positioned on top of the sidewalls between adjacent trusses.

6. The modular canopy of claim 5, wherein the cover section is removable.

7. The modular canopy of claim 5, wherein the cover section is attached to the sidewalls with permanent fasteners that cannot be removed from the canopy without destroying the fasteners.

8. The modular canopy of claim 1, wherein:
the truss comprises a bracket and a flange;
the bracket has an extended width dimension; and
the flange has an extended width dimension orthogonal to the extended width dimension of the bracket.

9. The modular canopy of claim 1, further comprising permanent fasteners attaching the side panels, trusses and tracks together that cannot be removed from the canopy without destroying the fasteners.

10. A sootblower with modular canopy, comprising:
a long, retractable sootblower comprising a carriage assembly; and
a modular canopy comprising:
a front mounting structure configured for attaching the canopy to an exterior surface of a furnace wall;
a rear mounting structure;
a pair of substantially parallel opposing sidewalls extending from the front mounting structure to the rear mounting structure;
a pair of tracks for supporting the carriage assembly of the sootblower, each track attached to one of the sidewalls;
at least one truss connecting the opposing sidewalls to each other;
wherein each sidewall comprises at least two substantially identical standard side panels; and
wherein, for each sidewall, the truss is located at a junction between adjacent side panels and connect the side panels to each other.

11. The sootblower with modular canopy of claim 10, wherein each sidewall further includes at least one of the side panels trimmed to a desired length.

12. The sootblower with modular canopy of claim 11, wherein each sidewall further includes at least two substantially identical full-length side panels and an additional standard side panel trimmed to a desired length.

13. The sootblower with modular canopy of claim 10, wherein the each truss section connects two adjacent side panels of each sidewall and extends over the sidewalls to connect the sidewalls to each other.

14. The sootblower with modular canopy of claim 10, wherein:
the truss comprises a bracket and a flange;
the bracket has an extended width dimension; and
the flange has an extended width dimension orthogonal to the extended width dimension of the bracket.

15. The sootblower with modular canopy of claim 10, further comprising at least two trusses and at least one removable cover positioned on top of the sidewalls and extending between the trusses.

16. The sootblower with modular canopy of claim 10, further comprising permanent fasteners attaching the side panels, trusses and tracks together that cannot be removed from the canopy without destroying the fasteners.

17. A method for manufacturing modular canopies for long, retractable sootblowers, comprising the steps of:
obtaining a plurality of standardized side panel sections;
obtaining a plurality of standardized truss sections,
obtaining a plurality of lengths of track,
wherein each standardized side panel section comprises holes precisely located for attaching the track and the truss sections to the side panel sections;
wherein each standardized truss section comprises holes precisely located for attaching the side panel sections and the track to the truss sections;
wherein each length of track comprises holes precisely located for attaching the track to the truss sections and the side panel sections;
surface treating the side panel sections and truss sections to create galvanized, electroplated, or painted side panel and truss sections;
placing the standardized, surface treated side panel and truss sections into an inventory;
taking a sufficient number of the standardized side panel and truss sections from the inventory to construct a canopy of a desired length;
modifying a pair of lengths of track by cutting to correspond to the desired length;
fabricating a front mounting structure for the canopy;
fabricating a rear mounting structure for the canopy;
modifying a pair of the standardized side panels by trimming to give the canopy the desired length;
assembling the canopy from the front mounting structure, the rear mounting structure, the modified lengths of track, the modified side panels sections, and standardized side panel and truss sections; and
wherein the assembled canopy comprises a pair of substantially parallel opposing sidewalls comprising a plurality of the standardized side panels extending from the front mounting structure to the rear mounting structure with the trimmed lengths of track attached to the sidewalls, and at least one standardized truss connecting two adjacent side panels at the junction between adjacent side panels of each sidewall extending over the sidewalls and connecting the opposing sidewalls to each other.

18. The method of claim 17, further comprising the step of modifying the pair of the standardized side panels by cutting holes for connecting the first pair of side panels to the front mounting structure or the rear mounting structure.

19. The method of claim 17, further comprising the steps of:
configuring each truss with a bracket and a flange wherein the bracket has an extended width dimension and the flange has an extended width dimension orthogonal to the extended width dimension of the bracket.

20. The method of claim 17, further comprising the step of attaching the side panels, trusses and tracks together with permanent fasteners that cannot be removed from the canopy without destroying the fasteners.

* * * * *